March 2, 1954  W. C. MILLER ET AL  2,670,648
MOUNT FOR DISPERSING MEANS
Filed Oct. 10, 1949  2 Sheets-Sheet 1
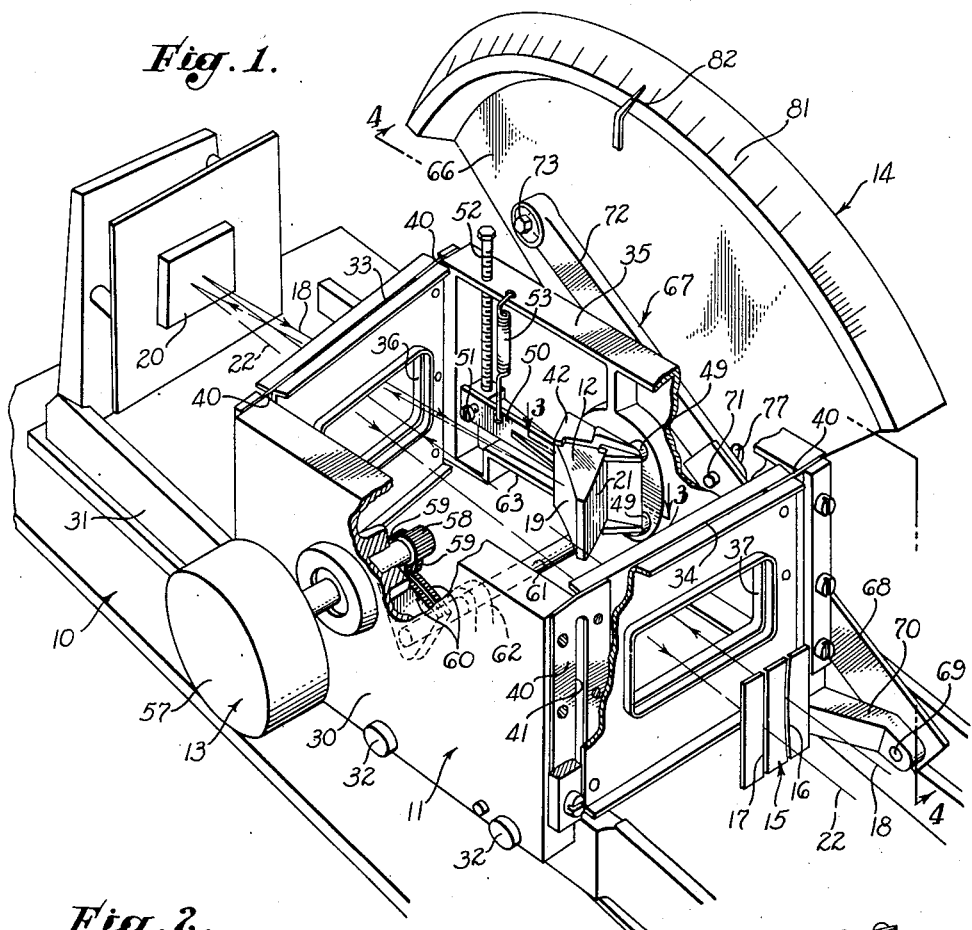
INVENTORS.
WILLIAM C. MILLER
DOUGLAS C. STRAIN
BY THEIR ATTORNEYS.
HARRIS, KIECH, FOSTER & HARRIS March 2, 1954  W. C. MILLER ET AL  2,670,648
MOUNT FOR DISPERSING MEANS
Filed Oct. 10, 1949  2 Sheets-Sheet 2
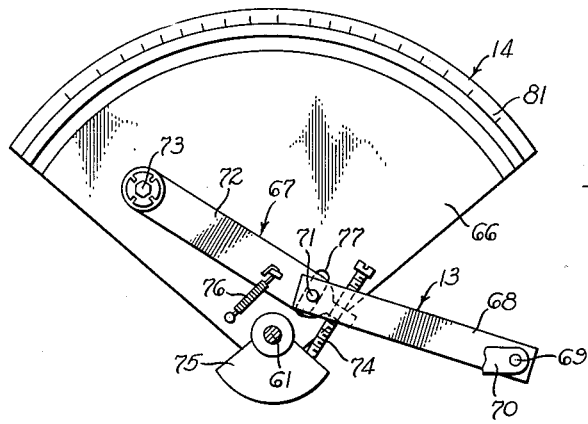
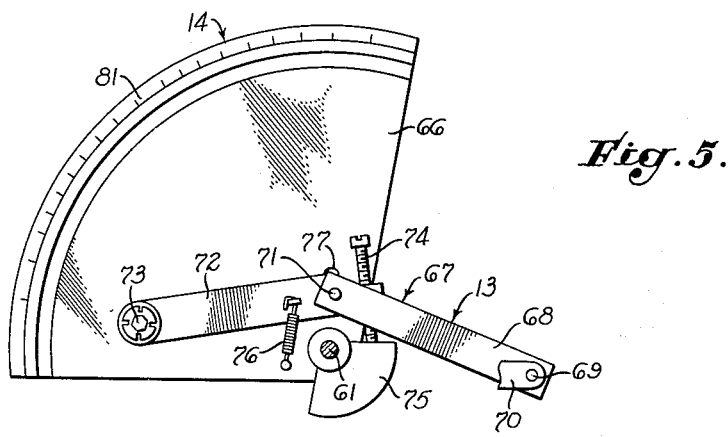
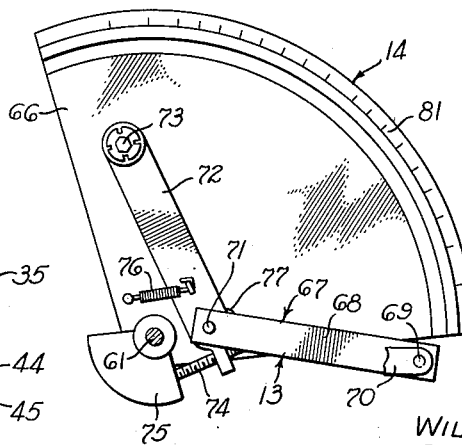
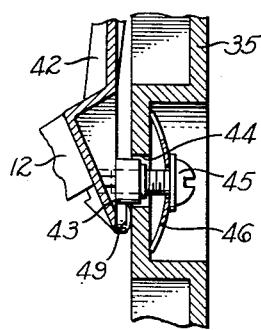
INVENTORS.
WILLIAM C. MILLER
DOUGLAS C. STRAIN
BY THEIR ATTORNEYS.
HARRIS, KIECH, FOSTER & HARRIS Patented Mar. 2, 1954

2,670,648

UNITED STATES PATENT OFFICE 2,670,648

MOUNT FOR DISPERSING MEANS

William C. Miller, Pasadena, Calif., and Douglas C. Strain, Portland, Oreg., assignors to Beckman Instruments, Inc., a corporation of California Application October 10, 1949, Serial No. 120,542

13 Claims. (Cl. 88—14)

Our invention relates in general to spectroscopy and, more particularly, to a mount for a radiant-energy dispersing means which may be incorporated in spectroscopic apparatuses of various types. The mount of the invention may be employed for any dispersing means the focal length of which varies with variations in the wave length or frequency of the radiant energy being examined, and which produce a spectrum of the band type, examples of such a dispersing means being Fery prisms, prism-lens or grating-lens combinations, multiple-prism combinations, etc. Dispersing means of this character may be used for dispersing radiant energy without the visible range, e. g., electromagnetic radiation, as well as for dispersing radiant energy within the visible range.

Since the invention is particularly applicable to and was originally embodied in a mount for a Fery prism in a monochromator, it will be considered herein in such connection for purposes of illustration, although it will be understood that the invention is susceptible of other applications and that we do not intend to be limited to the particular applications selected for consideration herein.

The present application discloses in part the subject matter disclosed and claimed in the application of William C. Miller on "Fery-Prism Monochromator," Serial No. 117,557, filed September 24, 1949, now U. S. Patent No. 2,594,334, issued April 29, 1952, reference to which is hereby made.

In order to examine different portions of a spectrum with such a dispersing means as a Fery prism in such a spectroscopic apparatus as a monochromator, it is necessary to rotate the Fery prism, or other dispersing means, so as to present different bands of the spectrum to an exit slit. Since the Fery prism is provided with curved refracting and reflecting surfaces, the focal length of the Fery prism of necessity varies with the wave length of the radiant energy. Since it is desirable to fix the position of the entrance slit in a Fery-prism spectrograph, or the positions of the entrance and exit slits in a Fery-prism monochromator, in order to simplify the slit design and the energy producing and receiving devices associated with the Fery prism, it is necessary to subject the Fery prism (or any other dispersing means the focal length of which varies with wave length) to simultaneous rotational and translational motion to compensate for the variation in focal length with wave length.

Ideally, such simultaneous rotational and translational motion of a Fery prism is attained by swinging the prism about a pivot point equidistant from the prism and the slit or slits associated therewith. As an illustrative example, in the case of a Fery prism having a focal distance of eighteen inches, the ideal pivot point is located approximately sixteen inches away from the prism and the slit or slits. It will be apparent that employing a pivoted carriage of such length for the Fery prism is out of the question if a compact apparatus is desired and a primary object of our invention is to provide a carriage for the Fery prism which produces the desired simultaneous rotational and translational motion, but which is compact.

We attain the primary object of our invention by employing as the carriage for the Fery prism a hinged quadrilateral having one of its sides fixed, the Fery prism being mounted on the opposite side of the quadrilateral. An important object of the invention is to provide a dispersing-means mount which includes such a hinged quadrilateral.

Such a hinged quadrilateral is conventionally known as a three-bar linkage and this term will be employed hereinafter for convenience. The three-bar linkage includes two spaced cranks which are pivotally connected to a frame at spaced points, the frame forming the fixed side of the quadrilateral. A link is pivotally connected at its ends to the ends of the cranks to complete the quadrilateral, the Fery prism being mounted on the link.

With such a three-bar linkage, as long as the length of the link, i. e., the distance between the points of pivotal connection of the cranks to the link, and the distance between the points of pivotal connection of the cranks to the frame are unequal, the Fery prism, or other dispersing means, is subjected to simultaneous rotational and translational motion as the cranks rotate relative to the frame, the provision of such a three-bar linkage in a Fery-prism mount being another object of the invention.

A further object is to provide a dispersing-means mount wherein the length of the movable link which carries the Fery prism differs from the distance between the points of pivotal connection of the cranks to the frame and wherein the Fery prism, or other dispersing means, is located within the quadrilateral defined by the three-bar linkage.

Still another object is to provide a dispersing-means mount in which the length of the movable link differs from the distance between the points of pivotal connection of the cranks to the frame and wherein the Fery prism, or other dispersing means, is mounted without the quadrilateral defined by the three-bar linkage.

An important object is to provide a dispersing-means mount wherein the cranks of the three-bar linkage are pivotally connected to the frame and the movable link pivotally connected to the cranks by flexible reeds. This construction provides pivotal connections which are free from any play, this being an important feature of the invention.

Another object of the invention is to provide a dispersing-means mount in which the Fery prism, or other dispersing means, is carried by a support which, in turn, is carried by the movable link of the three-bar linkage, the support being adjustable relative to the movable link to permit proper alignment of the elements of the optical system of the apparatus incorporating the Fery prism.

Another object is to provide a dispersing-means mount in which the Fery prism, or other dispersing means, is located within the quadrilateral defined by the three-bar linkage and wherein one of the cranks comprises a member having a window therein through which radiant energy is admitted to the refracting surface of the prism and through which the dispersed radiant energy is directed by the prism.

An important object of the invention is to provide a mount including an indicating means, which may be calibrated in units of wave length, or other suitable units, and which has a movable component, and including an actuating means for moving the three-bar linkage and the movable component of the indicating means in unison to provide a continuous indication of the wave length corresponding to the position of the dispersing means.

The optical materials employed for prisms and other optical elements do not disperse radiant energy uniformly, their dispersive powers ranging from a minimum at one point in the spectral range for which they are used to a maximum at another point in the spectral range. The maximum dispersive power of a typical optical material may be as much as forty times its minimum dispersive power over a usable spectral range. In view of such variations in dispersive power with the wave length, it will be apparent that if the three-bar linkage and the movable component of the indicating means of the present invention are moved at constant relative speeds, the wave length scale of the indicating means is compressed at the wave length where the dispersive power of the optical material of the dispersing means is a minimum and is expanded at the point where the dispersive power thereof is a maximum.

An important object of the present invention is to provide an actuating means for the three-bar linkage and the movable component of the indicating means which includes means for varying the relative speeds of the three-bar linkage and the movable component of the indicating means as the latter moves from one end of its travel to the other so as to compensate for such variations in the dispersive power of the optical material of the dispersing means with variations in wave length. Another object is to provide such an actuating means which permits the use of a scale substantially linear with wave length in the indicating means.

Another object is to provide such an actuating means which comprises an actuating crank and link means pivotally connected at one end to the actuating crank and at its other end to the three-bar linkage, the actuating crank carrying the movable component of the indicating means.

Another object is to provide an apparatus wherein the points of pivotal connection of the link means to the actuating crank and the three-bar linkage substantially coincide with a plane containing the axis of rotation of the actuating crank when the latter is substantially at one end of its travel.

Another object is to provide means for adjusting the point of pivotal connection of the link means to the actuating crank with respect to the actuating crank.

Another object is to provide a mount having the foregoing characteristics which is extremely compact.

The foregoing objects and advantages of the present invention, together with various other objects and advantages thereof which will become apparent, may be attained through the employment of the exemplary embodiments of the invention which are illustrated in the accompanying drawings and which are described in detail hereinafter. Referring to the drawings:

Fig. 1 is a perspective view of a portion of a monochromator which incorporates the dispersing-means mount of the present invention;

Fig. 2 is a diagrammatic plan view of a three-bar linkage for supporting a Fery prism;

Fig. 3 is a fragmentary sectional view on an enlarged scale which is taken along the broken line 3—3 of Fig. 1;

Fig. 4 is a fragmentary sectional view which is taken along the broken line 4—4 of Fig. 1;

Figs. 5 and 6 are sectional views which are similar to Fig. 4 but which illustrate substantially the extreme positions of a movable component of an actuating means of the invention; and, Fig. 7 is a diagrammatic plan view similar to Fig. 2 but illustrating another embodiment of the invention.

Referring particularly to Fig. 1, the monochromator embodying the dispersing-means mount of the invention includes a base 10 on which is mounted a carriage 11 for a Fery prism 12, the carriage 11 preferably being a three-bar linkage as will be discussed in more detail hereinafter. The mount also includes actuating means, indicated generally by the numeral 13, for moving the three-bar linkage 11 to simultaneously rotate and translate the Fery prism 12 to compensate for changes in the focal length of the prism with changes in wave length. Associated with the actuating means 13 is an indicating means 14 for indicating the wave length, or other variable, corresponding to the position of the prism 12. The monochromator includes a slit means 15, the latter being suitably mounted on the base 10 in a manner not specifically shown and providing entrance and exit slits 16 and 17, respectively. As disclosed and claimed in the aforementioned application of William C. Miller, the entrance slit 16 is curved to compensate for the extreme astigmatism characteristic of the Fery prism 12. As indicated by the broken line 18, the radiant energy admitted by the entrance slit 16 passes through the three-bar linkage 11 in a manner to be discussed hereinafter and is reflected toward a concave refracting surface 19 of the Fery prism by a reflector 20, the latter being mounted on the base 10. As is well known in the art, the radiant energy entering the Fery prism 12 is refracted by the refracting surface 19, passes through the prism, is reflected by a convex reflecting surface 21 thereof and is further refracted by the refracting surface 19 as it escapes from the prism. The refracted radiant energy follows a path indicated by the broken line 22 and is reflected by the reflector 20 toward the exit slit 17 to form a spectrum at the position of the exit slit. The spectrum may be examined at the exit slit 17, or the radiant energy from the spectrum may be employed to actuate a suitable energy receiver, etc., as is well known in the art. It will be understood that the reflector 20 is not an essential element of the monochromator disclosed, it being employed solely for the purpose of decreasing the over-all dimensions of the apparatus.

As hereinbefore discussed, in order to compensate for variations in the focal length of the Fery prism 12 with wave length, it is necessary to subject the prism to combined rotational and translational movement relative to the slits 16 and 17 as energy of different wave lengths is directed toward the exit slit 17, this being the function of the three-bar linkage 11 which will now be described in detail. As best shown in Figs. 1 and 2, the three-bar linkage 11 comprises a stationary member or frame 30 which has a generally plate-like configuration in the particular construction illustrated, the frame 30 being bolted or otherwise rigidly secured to the base 10. In the particular construction illustrated, the frame 30 is attached to a flange 31 on the base 10 by screws 32. The three-bar linkage 11 also includes a pair of cranks 33 and 34 which are pivotally connected to the frame 30 at spaced points and includes a link 35 which is pivotally connected at its ends to the outer ends of the cranks 33 and 34, the cranks and the link having plate-like configurations in the particular construction illustrated. The cranks 33 and 34 are provided with openings or windows 36 and 37, respectively, therein, through which the beams of radiant energy 18 and 22 pass in traveling from the entrance slit 16 to the prism 12 and back to the exit slit 17. This construction increases the compactness of the apparatus, which is another feature of the invention.

In order to avoid any lost motion in the three-bar linkage 11 and to confine movement thereof to one plane, the pivotal connections between the cranks 33 and 34 and the frame 30 and between the link 35 and the cranks are formed by flexible reeds 40 of beryllium-copper, or other suitable material. The reeds 40 are rectangular and are rigidly connected along their edges to the elements of the three-bar linkage 11. In order to avoid undue stiffness, the reeds 40 may be provided with longitudinal slots 41 therein intermediate the ends thereof, although this is not necessary.

The Fery prism 12 is carried by a support 42 which, as best shown in Fig. 3, includes a hub 43 extending into an enlarged bore 44 in the plate-like link 35, the prism being attached to the opposite side of the support 42, as by being cemented thereto, for example, and being disposed within the quadrilateral defined by the three-bar linkage 11. The hub 43 fits loosely in the bore 44 and the support 42 is attached to the link 35 by a screw 45 which extends through a cup-shaped spring washer 46 and which is threaded into a tapped bore in the hub 43. As shown in Fig. 1, the support 42 is provided with a pair of contacts 49 which bear against the inner face of the link 35 and which serve as pivot points for the support 42, thereby enabling the support 42 to pivot about an axis defined by the contacts 49. The support 42 is provided with an arm 50 which carries an adjusting screw 51, adapted to seat against the inner face of the link 35, for adjusting the position of the support 42 about the pivot axis defined by the contacts 49, such pivotal movement of the support about the pivot axis of the contacts being permitted by flexure of the cup-shaped washer 46. It will be apparent that the washer 46 tends to hold the adjusting screw 51 in engagement with the inner face of the link 35. The support 42 is also rotatable about the axis of the screw 45, which axis is perpendicular to the pivot axis provided by the contacts 49. The angular position of the support 42 about the axis of the screw 45 is controlled by an adjusting screw 52 which threadedly engages the link 35 and which bears against the upper surface of the arm 50 on the support. The arm 50 is biased into engagement with the adjusting screw 52 by a tension spring 53 which is connected at one end to the link 35 and which is connected at its other end to the arm 50. It will be apparent that this construction provides the support 42 with two degrees of rotational freedom and provides an adjusting means for positioning the support, and the Fery prism 12 carried thereby, relative to the link 35. Such adjusting means permits proper alignment of the Fery prism 12 with the slits 16 and 17.

Considering the actuating means 13, it includes an actuating knob 57 having a shaft which is journaled in a bore through the frame 30 and which carries a gear 58 at its inner end. The gear 58 is meshed with gears 59 which, in turn, are meshed with gear segments 60, the gears 59 serving as idlers. There are two of the gears 59 and two of the gear segments 60, the purpose of this arrangement being to eliminate any backlash. The gear segments 60 are fixed on a shaft 61 which is journaled in bearings 62 being visible in Fig. 1. The shaft 61 extends across the three-bar linkage 11 and through an elongated notch 63 in the link 35, the purpose of the elongated notch 63 being to permit transverse movement of the link 35 relative to the shaft. Fixed on the opposite end of the shaft 61 from the gear segments 60 is a sector 66 which serves as an actuating crank for moving the three-bar linkage 11, the sector or actuating crank 66 being connected to the link 35 of the three-bar linkage by a link means 67. As best shown in Fig. 4, the link means 67 includes a first link 68 which is pivotally connected at 69 to an arm 70 which, in turn, is rigidly connected to the link 35 of the three-bar linkage 11. The opposite end of the first link 68 is, in effect, pivotally connected at 71 to the actuating crank 66. Actually, the opposite end of the first link 68 is pivotally connected at 71 to one end of a second link 72 which is pivotally connected at its other end, at 73, to the actuating crank 66. However, the position of the pivot point 71 is adjustably fixed with respect to the actuating crank 66 by engagement of an adjusting screw 74 with a counterbalance 75 on the actuating crank, the adjusting screw being threaded through an opening in the second link 72 and being held in engagement with the counterbalance 75 by a tension spring 76 which is connected at one end to the second link 72 and at its other end to the actuating crank 66. Thus, the pivot point 71 is fixed relative to the actuating crank 66 for any particular setting of the adjusting screw 74, the pivotal connection at the point 71 being provided by a pin, movement of which relative to the actuating crank 66 is permitted by a slot 77 therein. As will become apparent, the adjusting screw 74 provides a means for adjusting the indicating means 14 so that the wave length indication provided by the indicating means precisely corresponds to the position of the Fery prism 12.

Considering now the operation of the three-bar linkage 11 and the actuating means 13, it will be apparent that as the knob 57 is rotated, the actuating crank 66 is rotated to move the link 35 of the three-bar linkage through the link means 67. As indicated in Fig. 2, this moves the Fery prism 12 along an arcuate path which is indicated by the double headed arrow 80, thereby simultaneously rotating and translating the Fery prism relative to the entrance and exit slits 16 and 17. Thus, the three-bar linkage 11 simultaneously rotates the Fery prism 12 to change the wave length of the radiant energy directed toward the exit slit 17 and translates the prism to compensate for variations of the focal length of the prism with wave length, which is an important feature of the invention. It will be noted that moving the prism 12 along the arcuate path indicated by the arrow 80 results in a slight lateral displacement of the prism in a direction normal to the desired translational motion. Such lateral displacement introduces a slight error in the focus of the prism, but this is largely absorbed because of the depth of focus of the prism.

It will be noted that in order to obtain the desired motion for the prism 12, it is necessary that the length of the link 35 of the three-bar linkage 11 be greater than the distance between the points of pivotal connection of the cranks 33 and 34 to the frame 30, this being true only for the particular position of the prism 12 relative to the link 35 which is shown in Figs. 1 and 2. In Fig. 7, the prism 12 is shown as mounted on the link 35 without the quadrilateral defined by the three-bar linkage 11 and, for the particular relative positions of the prism 12 and the link 35 shown in Fig. 7, it is necessary for the length of the link 35 to be less than the distance between the points of pivotal connection of the cranks 33 and 34 to the frame 30 in order to obtain the desired combined rotational and translational movement for the prism. It will be understood that other arrangements of the Fery prism 12 relative to the three-bar linkage 11 may also be employed, the ones illustrated in Figs. 2 and 7 being intended as illustrative only.

The actuating crank or sector 66 forms a movable component of the indicating means 14 and, in the particular construction illustrated, is provided on its periphery with an arcuate scale 81 calibrated in suitable units, such as units of wave length, wave number, frequency, etc., the indicating means preferably also including a suitable pointer 82 which cooperates with the scale 81 to indicate the scale unit corresponding to the position of the Fery prism 12. Thus, the actuating means 13 automatically moves the arcuate scale 81 relative to the pointer 82 as it rotates and translates the Fery prism 12 to provide a constant indication of the wave length corresponding to the position of the Fery prism.

As previously pointed out, a feature of the invention is to provide means for moving the movable component of the indicating means 14, i. e., the sector 66 and scale 81 thereon, at a speed which varies relative to the speed of the Fery prism 12 so as to render the scale 81 more nearly linear. Thus, this construction compensates for variations in the dispersive power of the optical material forming the Fery prism 12 with wave length to convert a nonlinear function into a more nearly linear function to avoid undue compression of any one part of the scale 81.

Considering how the foregoing is accomplished, and referring particularly to Figs. 4 to 6, it will be noted that as the sector 66 approaches one end of its travel (Fig. 6), the pivot points 69 and 71 move substantially into coincidence with a perpendicular to the axis of rotation of the sector. Thus, with the sector in the position shown in Fig. 6, it will be apparent that the sector can rotate through a relatively large angle without producing any substantial movement of the link 35 of the three-bar linkage 11 because of the fact that the pivot point 71 is moving substantially perpendicularly of the direction of travel of the link 35. On the other hand, when the sector 66 approaches the opposite end of its travel (Fig. 5), the pivot point 71 is moving substantially parallel to the direction of travel of the link 35 of the three-bar linkage 11 to produce substantial movement of the link 35 for a relatively small angular displacement of the sector. It will be noted that, in Fig. 5, the pivot points 69 and 71 lie on lines which are perpendicular to the axis of rotation of the sector and which include an angle of approximately 90° therebetween.

Thus, with this construction, when the sector 66 is at one extreme of its travel, the Fery prism 12 is moved at a low speed relative to the rotational speed of the sector, and when the sector is at the other extreme of its travel, the prism is moved at a high speed relative to the rotational speed of the sector. By locating that portion of the wave length scale which would normally be compressed (in the range of minimum dispersive power of the optical material forming the prism 12) on that portion of the sector 66 which moves at a high speed relative to the speed of the prism, such normally compressed portion of the scale is expanded. Similarly, by locating that portion of the wave length scale which would normally be expanded (in the range of maximum dispersive power of the optical material of the prism) on that portion of the sector 66 which moves at a relatively low speed compared to the speed of the prism, such normally expanded portion of the scale is compressed. In this manner, a scale 81 which is substantially linear with wave length, for example, is obtained, which is an important feature of the invention. In effect, the driving connection between the Fery prism 12 and the indicating means 14 is essentially a sine-bar mechanism.

It will thus be apparent that our invention provides a Fery-prism mount which is compact, yet which permits simultaneous rotational and translational motion of the Fery prism 12 to compensate for changes in focal length with wave length and provides a wave length indicating means 14 which compensates for variations in the dispersive power of the optical material of the Fery prism with wave length. Although we have disclosed two exemplary embodiments of our invention herein for purposes of illustration, it will be understood that we do not intend to be limited specifically thereto and hereby reserve the right to all such changes, modifications and substitutions as properly come within the scope of the invention as defined in the appended claims.

We claim as our invention:

1. In a radiation dispersing device, the combination of: a three-bar linkage including a frame, a pair of cranks pivotally connected to said frame and a link pivotally connected to said cranks, one of said cranks having a window therein; a radiation dispersing means carried by said link within the quadrilateral defined by said three-bar linkage, said dispersing means having a surface which is directed toward said window to receive radiant energy therefrom; and actuating means for moving said three-bar linkage.

2. A dispersing device according to claim 1 wherein the other of said cranks is also provided with a window therein, said device including a reflector connected to said frame and aligned with said windows to receive radiant energy therethrough and to direct such radiant energy through one of said windows toward said surface of said dispersing means.

3. In a spectroscopic means, the combination of: a three-bar linkage comprising a frame, a pair of cranks pivotally connected to said frame and a link pivotally connected to said cranks, the length of said link differing from the distance between the points of pivotal connection of said cranks to said frame, a band spectrum forming radiation dispersing means carried by said link, actuating means for moving said three-bar linkage, and an aperture fixed with respect to said frame for selectively transmitting a portion of a band spectrum.

4. In a mount for a dispersing means, the combination of: a three-bar linkage comprising a frame, a pair of cranks pivotally connected to said frame and a link pivotally connected to said cranks, the length of said link differing from the distance between the points of pivotal connection of said cranks to said frame, said pivotal connection between said cranks and said frame and between said link and said cranks being provided by flexible reeds, a band spectrum forming radiation dispersing means carried by said link, and actuating means for moving said three-bar linkage.

5. A mount for a dispersing means as defined in claim 4 wherein the length of said link is less than the distance between the points of pivotal connection of said cranks to said frame.

6. A mount for a dispersing means according to claim 4 wherein the length of said link is greater than the distance between the points of pivotal connection of said cranks to said frame.

7. In a mount for a dispersing means, the combination of: a three-bar linkage comprising a frame, a pair of cranks pivotally connected to said frame and a link pivotally connected to said cranks, the focal length of said dispersing means varying with the wave length of the radiation dispersed thereby, a radiation dispersing means carried by said link, the distance between the points of pivotal connection of said cranks to said frame differing from the distance between the points of pivotal connection of said cranks to said link, and actuating means for moving said three-bar linkage, said actuating means including a pivoted actuating crank, link means pivotally and directly connected to said actuating crank and to said three-bar linkage, and means for rotating said actuating crank.

8. A mount for a dispersing means according to claim 7 wherein said link means includes a second link pivotally connected at one end to said actuating crank, a first link pivotally connected at one end to the other end of said second link, the other end of said first link being pivotally connected to said three-bar linkage, and means for biasing the point of pivotal connection between the first and second links of said link means toward said actuating crank.

9. In a mount for a dispersing means, the combination of: a three-bar linkage comprising a frame, a pair of cranks pivotally connected to said frame and a link pivotally connected to said cranks, the distance between the points of pivotal connection of said cranks to said frame differing from the distance between the points of pivotal connection of said cranks to said link, actuating means for moving said three-bar linkage, said actuating means including an actuating crank, a second link pivotally connected at one end to said actuating crank, and a first link pivotally connected at one end to the other end of said link, the other end of said first link being pivotally connected to said three-bar linkage, means for restraining the point of pivotal connection between said first and second links relative to said actuating crank, and means for rotating said actuating crank.

10. A mount for a dispersing means as set forth in claim 9 including means for adjusting the position of said point of pivotal connection between said first and second links relative to said actuating crank.

11. A mount for a dispersing means according to claim 7 wherein the points of pivotal connection of said link means to said actuating crank and said three-bar linkage lie substantially in a plane containing the axis of rotation of said actuating crank for one position of said actuating crank.

12. A mount for a dispersing means as defined in claim 11 wherein said point of pivotal connection of said link means to said actuating crank lies in a first plane containing the axis of rotation of said actuating crank for another position of said actuating crank and wherein said point of pivotal connection of said link means to said three-bar linkage lies in a second plane containing the axis of rotation of said actuating crank for said other position of said actuating crank, said first and second planes including an angle of the order of magnitude of 90° therebetween.

13. In a mount for a dispersing means, the combination of: a three-bar linkage comprising a frame, a pair of cranks pivotally connected to said frame and a link pivotally connected to said cranks, the length of said link differing from the distance between the points of pivotal connection of said cranks to said frame, a support carried by said three-bar linkage and rotatable relative thereto about mutually perpendicular axes, adjusting means for rotating said support relative to said three-bar linkage about said axes, a band spectrum forming radiation dispersing means carried by said support, and actuating means for moving said three-bar linkage.

WILLIAM C. MILLER.
DOUGLAS C. STRAIN.

References Cited in the file of this patent
UNITED STATES PATENTS

| Number | Name | Date |
| --- | --- | --- |
| 407,409 | Lucas | July 23, 1889 |
| 904,613 | Hatt | Nov. 24, 1908 |
| 957,502 | Dupuis | May 10, 1910 |
| 1,007,346 | Fery | Oct. 31, 1911 |
| 1,711,909 | Stalcup | May 7, 1929 |
| 2,408,512 | Gradisar | Oct. 1, 1946 |
| 2,412,940 | Avery | Dec. 24, 1946 |

OTHER REFERENCES

Hardy and Perrin, "Principles of Optics," published in 1932 (First edition) by McGraw-Hill Book Co., New York city, pages 111 and 112.